United States Patent
Lee et al.

(10) Patent No.: US 7,586,935 B2
(45) Date of Patent: Sep. 8, 2009

(54) KVM SWITCH WITH AN INTEGRATED NETWORK HUB

(75) Inventors: Chieh-Kwei Lee, Hsichih (TW); Chao-Hsuan Hsueh, Hsichih (TW)

(73) Assignee: Aten International Co., Ltd., Taipei Hsien (TW)

(*) Notice: Subject to any disclaimer, the term of this patent is extended or adjusted under 35 U.S.C. 154(b) by 606 days.

(21) Appl. No.: 11/088,926

(22) Filed: Mar. 25, 2005

(65) Prior Publication Data

US 2006/0215687 A1 Sep. 28, 2006

(51) Int. Cl.
*H04L 12/66* (2006.01)
*H04J 3/16* (2006.01)
*H04J 3/22* (2006.01)
*H04J 1/00* (2006.01)
*G06F 15/173* (2006.01)

(52) U.S. Cl. .............. 370/463; 370/466; 370/467; 370/489; 709/224; 709/239

(58) Field of Classification Search .......... 370/463, 370/466, 467, 489, 224, 239; 709/224, 239
See application file for complete search history.

(56) References Cited

U.S. PATENT DOCUMENTS 6,901,455 B2 * 5/2005 Gough ................. 710/8
2002/0143996 A1 * 10/2002 Odryna et al. ........ 709/246
2003/0035049 A1 * 2/2003 Dickens et al. ....... 348/100
2003/0191878 A1 * 10/2003 Shirley ................. 710/100
2005/0044266 A1 * 2/2005 O'Neil .................. 709/238
2005/0052465 A1 * 3/2005 Moore et al. ......... 345/603
2005/0066000 A1 * 3/2005 Liaw et al. ........... 709/204
2005/0129035 A1 * 6/2005 Saito .................... 370/401
2005/0235079 A1 * 10/2005 Chen ...................... 710/73
2006/0116023 A1 * 6/2006 Spitaels et al. ....... 439/532
2007/0282997 A1 * 12/2007 Trochman ............ 709/224
2008/0031165 A1 * 2/2008 Shen et al. ............ 370/293
2008/0147922 A1 * 6/2008 Chou ..................... 710/62

FOREIGN PATENT DOCUMENTS

TW 453068 9/2001

* cited by examiner

*Primary Examiner*—Chi H Pham
*Assistant Examiner*—Farah Faroul

(57) ABSTRACT

A Keyboard-Video-Mouse (KVM) switch is provided for a set of user interface devices to share a plurality of computers. The Keyboard-Video-Mouse (KVM) switch comprises a network port, a second interface, at least one first interface, a switch device and an Ethernet hub. The network port is arranged to connect to a network. The second interface is arranged to connect the set of user interface devices. The first interface is arranged to connect the computers, and the first interface has a port for connecting a network interface of the computers. The switch device is arranged to route paths between the second interface and the first interface. The Ethernet hub is arranged to connect the network port and the port of the first interface.

20 Claims, 4 Drawing Sheets

KVM SWITCH WITH AN INTEGRATED NETWORK HUB

BACKGROUND

1. Field of Invention

The present invention relates to a KVM switch. More particularly, the present invention relates to a KVM switch having a network hub for supporting the over-IP process.

2. Description of Related Art

With the rapid development in information technology, computers and their peripherals have become very popular. Typically, each computer is equipped with one set of user interface devices, may including a keyboard, a mouse and a monitor. However, this equipment wastes money and occupies too much space if one has several computers. Therefore, a keyboard-video-mouse (KVM) switch is proposed to use at least one set of user interface devices to manage several computers and their peripherals. Using the KVM switch reduces hardware cost and decreases waste of space while simultaneously conquering the problem of compatibility between different interfaces.

Traditionally, the KVM switch connects multiple computers and multiple sets of user interface devices through many combined cables. In addition, due to network applications have become commonplace in recent years, every computer may be configured with a network interface card connected to a separated Ethernet hub through an Ethernet cable (e.g. a CAT5 cable). When the KVM switch is used along with a network hub, their cables, i.e. the combined KVM cables and Ethernet cables, are crowded together.

So many cables occupy much space and are not easy to put in order because the cables are different in shapes and lengths. Moreover, system administrators encounter difficulty in managing and checking the complicated cables, especially when changing, moving, maintaining or repairing the cables. In addition, costumers need to separately buy a network hub and a KVM switch to meet their sharing and networking requirements, which is very inconvenient and unnecessarily costly.

SUMMARY

It is therefore an aspect of the present invention to provide a keyboard-video-mouse (KVM) switch, in which a network hub is integrated, to reduce the cost, reduce the occupied space and make managing the arrangement of cables easy for users.

According to one preferred embodiment of the present invention, a KVM switch is provided for a set of user interface devices to share a plurality of computers. The KVM switch comprises a network port, a second interface, at least one first interface, a switch device and an Ethernet hub. The network port is arranged to connect to a network. The second interface is arranged to connect the set of user interface devices. The first interface is arranged to connect the computers, and the first interface has a port for connecting a network interface of the computers. The switch device is arranged to route paths between the second interface and the first interface. The Ethernet hub is arranged to connect the network port and the port of the first interface.

It is another aspect of the present invention to provide a KVM switch, which supports the over-IP process by an integrated network hub, for facilitating the transmission of over-IP data.

According to another preferred embodiment of the present invention, a KVM switch is provided for a set of user interface devices to share a plurality of computers. The KVM switch comprises at plurality of first interfaces, a second interface, a network port, a plurality of ports, an Ethernet controller, an Ethernet hub and a switch device.

The first interfaces are arranged to connect the computers, and the second interface is arranged to connect the set of user interface devices. The network port is arranged to connect to a network and to receive or transmit over-IP data of an over-IP process. The ports are arranged to connect network interfaces of the computers. The Ethernet controller is used for providing an MAC for the over-IP process, and the Ethernet hub is arranged to connect the network port, the Ethernet controller and the ports. The switch device is arranged to route paths between the second interface and the first interfaces, and the switch device is electrically connected to the Ethernet hub through the Ethernet controller for routing the over-IP data among the second interface, the first interfaces and the network port.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
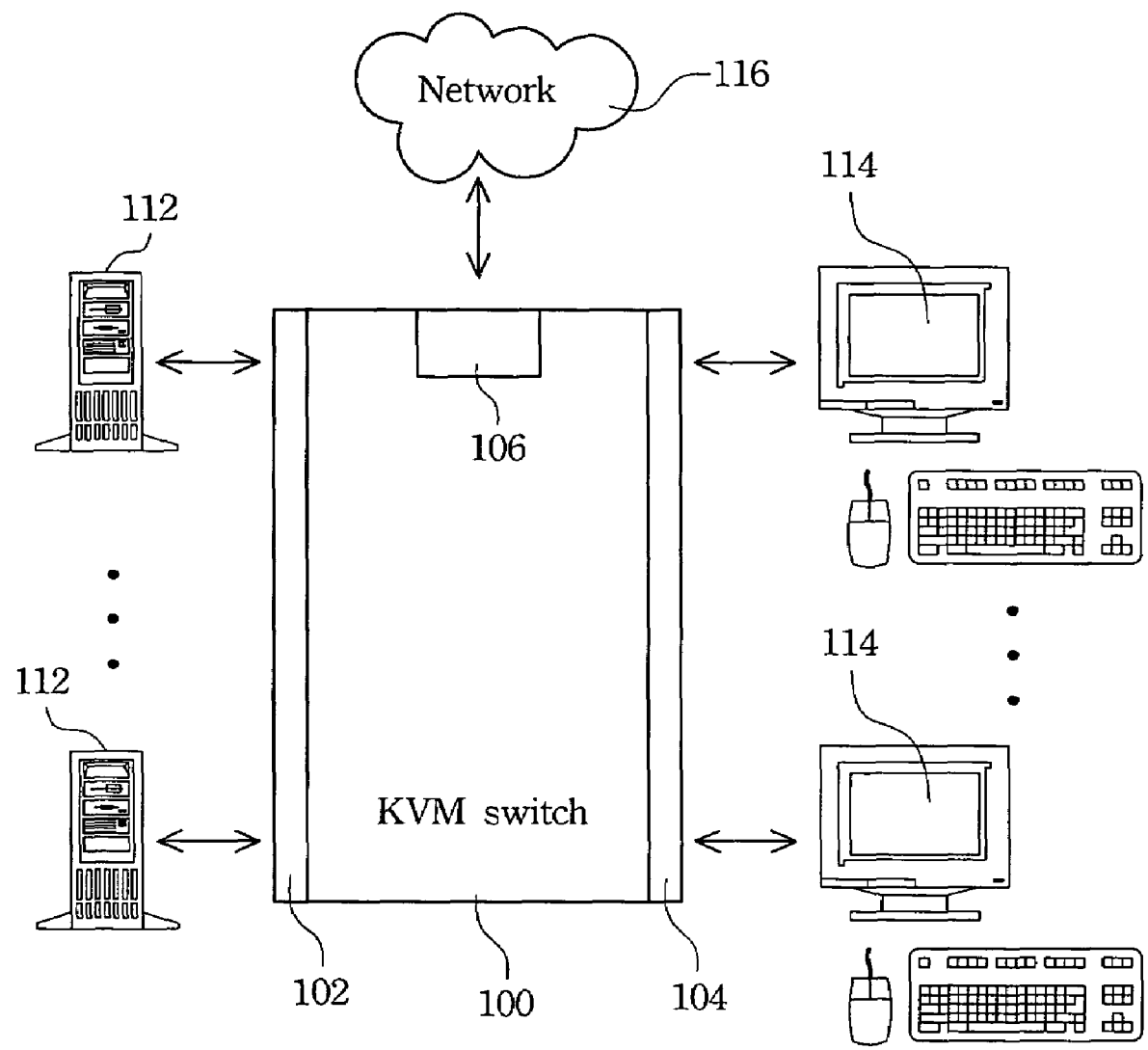
FIG. 1 is a schematic view of the external connection of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention integrates a network hub into a KVM switch, and further designs the KVM switch to support an over-IP process. Therefore, the KVM switch of the present invention is cheaper, lighter and more convenient for users than conventional arrangements.

FIG. 1 is a schematic view of the external connection of one preferred embodiment of the present invention for illustrating the connections among a network, a plurality of computers 112 and plural sets of user interface devices 114 through a KVM switch 100. As illustrated in FIG. 1, a first interface 102 is arranged to connect the computers 112, and a second interface 104 is arranged to connect the sets of user interface devices 114. Moreover, the KVM switch 100 connects the computers 112 and the sets of user interface devices 114 to the network 116 through a network port 106, e.g. an uplink port.

The computers 112 can be servers, personal computers, notebooks or other computing devices having video output functions. One of the sets of user interface devices 114 includes manipulating devices (such as a keyboard and a mouse) and a display device (such as a CRT display or a LCD display). The network 116 can be a local area network (LAN), a wireless area network (WAN) or other communication networks.

Figure 2A:
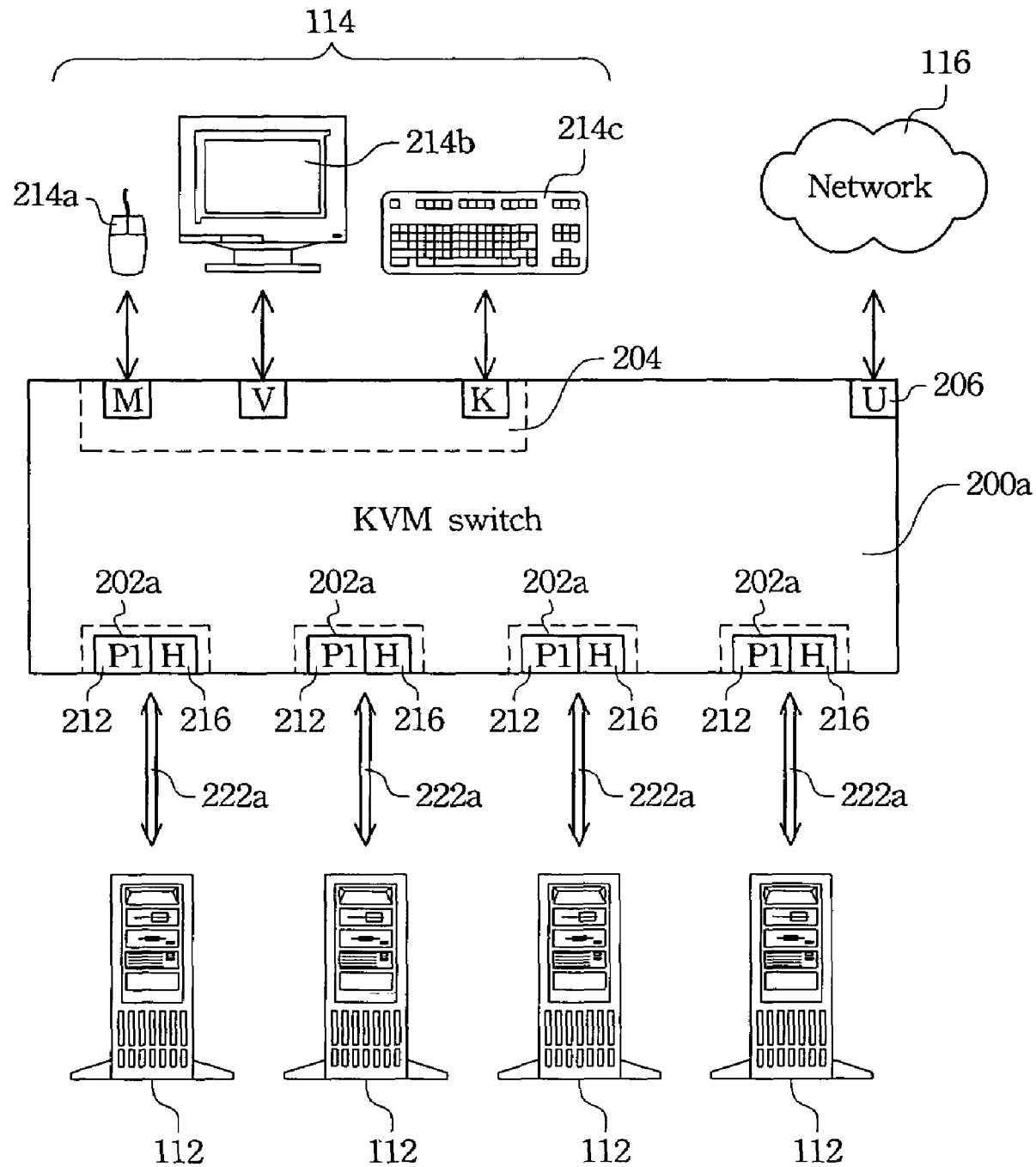
FIGS. 2A and 2B illustrate schematic views of two preferred embodiments of the present invention.
Figure 2B:
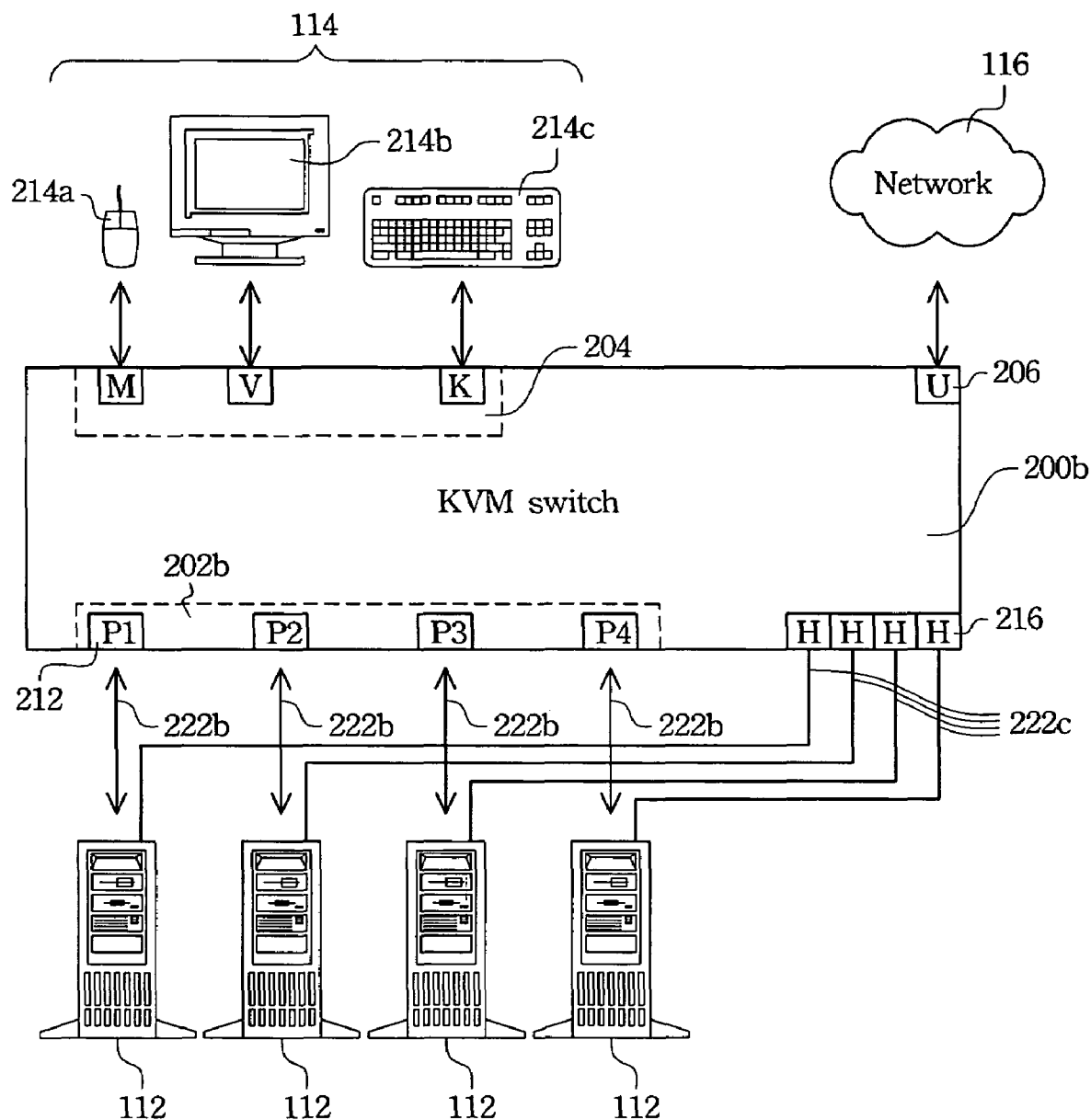

FIGS. 2A and 2B illustrate schematic views of two preferred embodiments of the present invention for interpreting two types of the system architecture of the KVM switch 100. The differences between the two types of the system architecture include the first interfaces and the cables for connecting the KVM switch and the computers. For clarity, only one set of user interface devices 114 and four computers 112 are illustrated in FIGS. 2A and 2B. The set of user interface devices 114 includes a mouse 214a, a display 214b and a keyboard 214c, each of which is separately connected to its corresponding connector of a second interface 204 of a KVM switch 200a.

In a first type of the system architecture, illustrated in FIG. 2A, each of first interfaces 202a of the KVM switch 200a includes a set of connectors 212 for connecting mouse, video and keyboard connectors of a computer 112, in addition to including a port 216 for connecting a network interface of the computer 112. According to another preferred embodiment of the present invention, the set of connectors 212 and the port 216 can be combined, and therefore a combined cable 222a, which is used to transmit an Ethernet signals for network connection and keyboard/video/mouse signals bound together, is easily provided to connect the first interface 202a of the KVM switch 200a to one of the computers 112, especially in this first type of system architecture.

That is, due to the possible and simple combination of the Ethernet signal and the keyboard/video/mouse signals, the first type of system architecture can decrease the occupied space, enabling users to easily manage the arrangement of those cables.

In a second type of the system architecture, illustrated in FIG. 2B, each of first interfaces 202b of the KVM switch 200b includes plural sets of connectors 212 for connecting mouse, video and keyboard connectors of computers 112. The KVM switch 200b further has a plurality of ports 216 arranged to connect network interfaces of the computers 112. The set of connectors 212 and the port 216 are not adjacent to each other, and therefore an Ethernet cable 222c (such as a CAT5 cable) and a keyboard/video/mouse cable 222b are separately used to connect the network interface and the mouse, video and keyboard connectors of one of the computers 112.

That is, due to the separate cables of different functions, the second type of system architecture can be used more flexibly and conveniently for users to configure them in different locations and conditions. Moreover, the Ethernet cable and the keyboard/video/mouse cable are common and widely used in computer applications, and users thus can easily obtain and install them without any special order and attention.

Figure 3:
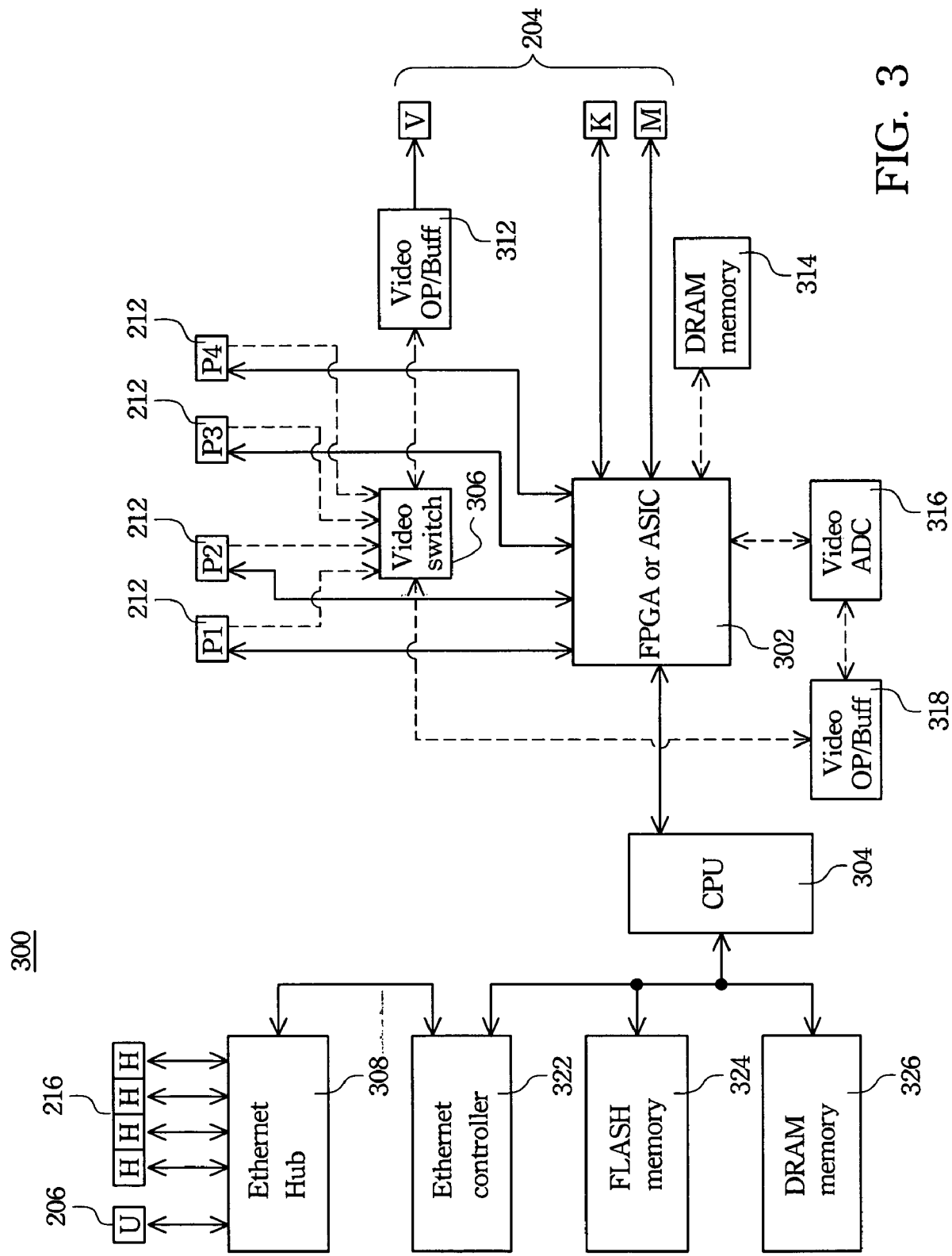
FIG. 3 is a schematic view of the interior of a KVM of one preferred embodiment of the present invention.

FIG. 3 is a schematic view of an interior of a KVM 300 of one preferred embodiment of the present invention, such as the KVM switch 200a or 200b in FIG. 2A or 2B. As shown in FIG. 3, an embedded micro-processor (MCP) 304 is used to handle the whole system's function of the KVM 300. An FPGA or ASIC 302 is used to handle keyboard and mouse signals between the computers connected to the sets of connectors 212 (P1~P4) and the sets of user interface devices connected to the second interface 204.

A video switch circuit 306 is arranged to provide a switch control to let one of the server's video signals to pass through. Moreover, the switch control is implemented by a high-speed MUX/DEMUX analog switch chip if the video signals are analog, for example. A video operational amplifier and/or video buffer 312 is provided between the video switch circuit 306 and the video connector (V) of the second interface 204, for enhancing the video signals and implementing the video gains. In other words, the switch device of the preferred embodiment includes the foregoing FPGA or ASIC 302, embedded micro-processor 304 and video switch 306.

Because an Ethernet hub 308 is integrated into the KVM switch 300 of the preferred embodiment, an over-IP process is therefore more easily implemented and obtains a good performance from this integration. The following descriptions use an example, which involves the video signals that are more complicated than the simple electrical signals, to illustrate the over-IP process performed by the KVM switch 300 of the preferred embodiment.

First, an Ethernet hub 308 is provided, which includes a main Ethernet-hub chip and further a LAN filter circuit. The Ethernet hub 308 is arranged to connect the network (e.g. the LAN or WAN) and the network interfaces of the computers through the network port 206 and the ports 216, respectively.

When the over-IP process is performed, over-IP data (e.g. video signals) is transmitted from a local computer (such as the computer connected to one of the sets of connectors 212) to one set of remote user interface devices, for example. First, the video signals pass through the video operational amplifier and/or video buffer 312 and the video switch circuit 306. A video operational amplifier and/or video buffer 318 is provided between the FPGA or ASIC 302 and a video analog-to-digital converter 316, for enhancing the video signals and implementing the video gains.

A video analog-to-digital converter (ADC) 316 is electrically connected to the video operational amplifier and/or video buffer 318 to provide an analog interface optimized for capturing RGB graphics signals from computers and outputting digital pixel signals. The FPGA or ASIC 302 of the preferred embodiment is arranged to handle image compression of video signals and the video sampling from the video ADC 316. In order to process the video signals of the over-IP process, a DRAM memory 314 is electrically connected to the FPGA or ASIC 302 to provide the storage of video signals and compressed data.

Then, the over-IP data, i.e. the converted foregoing video signals, is then transmitted from the FPGA or ASIC 302 to the Ethernet hub 308 through the embedded micro-processor 304. A DRAM memory 326 is electrically connected to the embedded micro-processor 304 and is arranged to store temp data and stack data of the over-IP process. A FLASH memory 324 is electrically connected to the embedded micro-processor 304 and is used to provide the storage of the over-IP process KVM.

After that, an Ethernet controller 322, such as a highly integrated Fast Ethernet controller which has full compliance with IEEE 802.3u 100Base-T specifications and IEEE 802.3x Full Duplex Flow Control, is connected to and used to provide an MAC of the KVM switch 300 to the Ethernet hub 308. The over-IP data, i.e. the video signals and remote keyboard/mouse data, is then transmitted to the network by the Ethernet hub 308. In addition, a LAN filter may be further used for the Ethernet controller 322. However, if the embedded micro-processor 304 is a SOC embedded Fast Ethernet controller, the Ethernet controller 322 can be omitted, but an additional Ethernet transceiver is still necessary.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard-video-mouse (KVM) switch for a set of user interface devices sharing a plurality of computers, the KVM switch comprising:
   a network port arranged to connect to a network;
   at least one first interface having a port and a set of connectors, where the set of connectors is arranged to connect to a set of keyboard, video and mouse connectors of the computers, wherein the port is for connecting to a network interface of the computers;
   a second interface arranged to connect to the set of user interface devices;
   an Ethernet hub connected between the network port and the port of the first interface; and
   a switch device arranged to route paths between the second interface and the first interface, wherein the switch device is connected between the first interface and the second interface, and the switch device is connected between the Ethernet hub and the set of connectors of the first interface.

2. The KVM switch of claim 1, wherein the KVM switch further comprises:
   at least one keyboard/video/mouse cable being connected between the first interface and one of the computers; and
   at least one Ethernet cable being connected between the port and one of the network interface of the computers.

3. The KVM switch of claim 1, wherein the KVM switch further comprises:
   at least one combined cable transmitting an Ethernet signal and keyboard/video/mouse signals bound together, and the combined cable being connected between the first interface and one of the computers.

4. The KVM switch of claim 1, wherein the KVM switch further comprises an Ethernet controller for providing Medium Access Control (MAC) used for an over-IP process based on the network.

5. The KVM switch of claim 1, wherein the KVM switch further comprises:
   a flash memory electrically connected to the switch device and arranged to store a firmware for an over-IP process based on the network; and
   a Dynamic Random Access Memory (DRAM) memory electrically connected to the switch device and arranged to store temp data and stack data of the over-IP process.

6. The KVM switch of claim 1, wherein the switch device further comprises an Field Programmable Gate Array (FPGA) or an Application-Specific Integrated Circuit (ASIC).

7. The KVM switch of claim 1, wherein the switch device comprises a microprocessor, an Field Programmable Gate Array (FPGA) and a video switch.

8. The KVM switch of claim 1, wherein the switch device comprises a microprocessor, an Application-Specific Integrated Circuit (ASIC) and a video switch.

9. The KVM switch of claim 1, further comprising a memory connected between the switch device and the Ethernet hub.

10. The KVM switch of claim 9, further comprising an Ethernet controller connected between the memory and the Ethernet hub.

11. The KVM switch of claim 1, further comprising an Ethernet controller connected between the switch device and the Ethernet hub.

12. The KVM switch of claim 1, further comprising a video amplifier connected between the switch device and the second interface.

13. The KVM switch of claim 1, further comprising a video buffer connected between the switch device and the second interface.

14. A keyboard video mouse (KVM) switch for a set of user interface devices sharing a plurality of computers, the KVM switch comprising:
   a plurality of first interfaces having a set of connectors, where the set of connectors is arranged to connect to a set of keyboard, video and mouse connectors of the computers;
   a second interface arranged to connect to the set of user interface devices;
   a network port arranged to connect to a network and to receive or transmit over-IP data of an over-IP process;
   a plurality of ports arranged to connect to network interfaces of the computers;
   an Ethernet controller for providing Medium Access Control (MAC) for the over-IP process;
   an Ethernet hub connected between the network port, the Ethernet controller and the ports; and
   a switch device arranged to route paths between the second interface and the first interfaces, wherein the switch device is electrically connected to the Ethernet hub through the Ethernet controller for routing the over-IP data among the second interface, the first interfaces, and the network port.

15. The KVM switch of claim 14, wherein the KVM switch further comprises:
   a plurality of keyboard/video/mouse cables, one of the keyboard/video/mouse cables being connected between one of the first interfaces and one of the computers; and
   a plurality of Ethernet cables, one of the Ethernet cables being connected between one of the ports and one of the network interfaces of the computers.

16. The KVM switch of claim 14, wherein the KVM switch further comprises:
   a plurality of combined cables, each of the combined cables transmitting an Ethernet cable and keyboard/video/mouse signals bound together, and one of the combined cables being connected between one of the first interfaces and one of the computers.

17. The KVM switch of claim 14, wherein the KVM switch further comprises:
   a flash memory electrically connected between the Ethernet hub and the switch device, and arranged to store a firmware for the over-IP process; and
   a Dynamic Random Access Memory (DRAM) memory electrically connected between the Ethernet hub and the switch device, and arranged to store temp data and stack data of the over-IP process.

18. The KVM switch of claim 14, wherein the switch device comprises an Field Programmable Gate Array (FPGA) or an Application-Specific Integrated Circuit (ASIC).

19. The KVM switch of claim 14, wherein the switch device comprises a microprocessor, an Field Programmable Gate Array (FPGA) and a video switch.

20. The KVM switch of claim 14, wherein the switch device comprises a microprocessor, an Application-Specific Integrated Circuit (ASIC) and a video switch.

* * * * *